United States Patent
Shipley et al.

(10) Patent No.: US 12,020,329 B1
(45) Date of Patent: Jun. 25, 2024

(54) SYSTEMS AND METHODS FOR DYNAMICALLY ADJUSTING PAY-PER-RIDE INSURANCE

(71) Applicant: United Services Automobile Association (USAA), San Antonio, TX (US)

(72) Inventors: Brian Francisco Shipley, Plano, TX (US); Qunying Kou, San Antonio, TX (US); Samip Dilip Mehra, Peoria, AZ (US); Carlos J P Chavez, San Antonio, TX (US); Timothy Shiveley, Farmers Branch, TX (US); Ric M. Pena, Boerne, TX (US); Joel S. Hartshorn, Port Orchard, WA (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/686,011

(22) Filed: Mar. 3, 2022

Related U.S. Application Data

(60) Provisional application No. 63/156,166, filed on Mar. 3, 2021.

(51) Int. Cl.
    *G06Q 40/08*     (2012.01)
    *G01C 21/34*     (2006.01)
    *G06Q 30/0283*     (2023.01)

(52) U.S. Cl.
    CPC ......... *G06Q 40/08* (2013.01); *G01C 21/3407* (2013.01); *G06Q 30/0284* (2013.01)

(58) Field of Classification Search
    CPC . G06Q 40/08; G06Q 30/0284; G01C 21/3407
    (Continued)

(56) References Cited

U.S. PATENT DOCUMENTS 9,361,599 B1 * 6/2016 Biemer ................. G06Q 40/08
9,390,452 B1 * 7/2016 Biemer ................. G06Q 40/02
(Continued)

OTHER PUBLICATIONS

Glowicki, "Using Uber, Lyft at Derby ? This will help", Courier-Journal, Louisville, KY, Proquest Document Id: 1787087955, May 6, 2016.*

*Primary Examiner* — Frantzy Poinvil
(74) *Attorney, Agent, or Firm* — Fletcher Yoder, P.C.

(57) ABSTRACT

A method may include receiving, via a processor, an indication that a vehicle is in use, determining that a user of the vehicle is expected to perform an online-platform task, and determining one or more routes to perform the online-platform task. The method may further include determining one or more insurance rates for the one or more routes based on a type of the online-platform task, one or more driving characteristics associated with the user, the one or more routes, or any combination thereof. Additionally, the method may include displaying a visualization indicative of the one or more insurance rates via an electronic display. Furthermore, the method may include receiving a selection of a first insurance rate of the one or more insurance rates that corresponds to a first route of the one or more routes, detecting that the vehicle is deviating from the first route, and adjusting the first insurance rate in response to detecting that the vehicle is deviating from the first route.

19 Claims, 4 Drawing Sheets

(58) Field of Classification Search
USPC .......................................................... 705/3–44
See application file for complete search history.

(56) References Cited

U.S. PATENT DOCUMENTS

| | | | |
|---|---|---|---|
| 10,657,597 B1* | 5/2020 | Billman | G06Q 40/08 |
| 10,817,950 B1* | 10/2020 | Iqbal | G07C 5/02 |
| 11,055,785 B1* | 7/2021 | Lundsgaard | G06Q 40/08 |
| 2014/0019170 A1* | 1/2014 | Coleman | G06Q 10/10 |
| | | | 705/4 |
| 2016/0171521 A1* | 6/2016 | Ramirez | B60K 35/00 |
| | | | 701/409 |
| 2016/0379310 A1* | 12/2016 | Madigan | G06Q 40/08 |
| | | | 705/4 |
| 2017/0234689 A1* | 8/2017 | Gibson | B60W 60/0015 |
| | | | 701/25 |
| 2017/0255966 A1* | 9/2017 | Khoury | B60W 40/00 |
| 2018/0018874 A1* | 1/2018 | McNew | G08G 1/096716 |

* cited by examiner

SYSTEMS AND METHODS FOR DYNAMICALLY ADJUSTING PAY-PER-RIDE INSURANCE

CROSS-REFERENCE TO RELATED APPLICATION

This application claims priority to and benefit of U.S. Provisional Patent Application Ser. No. 63/156,166, titled "SYSTEMS AND METHODS FOR DYNAMICALLY ADJUSTING PAY-PER-RIDE INSURANCE," filed on Mar. 3, 2021, the entirety of which is incorporated by reference into the present disclosure.

BACKGROUND

This section is intended to introduce the reader to various aspects of art that may be related to various aspects of the present techniques, which are described and claimed below. This discussion is believed to be helpful in providing the reader with background information to facilitate a better understanding of the various aspects of the present disclosure. Accordingly, it should be noted that these statements are to be read in this light, and not as admissions of prior art.

The proliferation of the gig economy has created a large number of online-platform service workers. These workers as associated with different risks related to vehicular insurance compared to other insurance users. As such, it may be beneficial to provide systems and methods for adjusting insurance products and services provided to these workers.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method may include receiving an indication that a user will drive a vehicle, determining that the user is intending to perform an online-platform service task, and determining one or more pay-per-ride insurance rates for purchase. In another embodiment, a method may include identifying that a user's vehicle is idling, determining that the user is performing an online-platform service task, and determining one or more pay-per-ride insurance rates for purchase. In another embodiment, a method may include identifying one or more vehicles for usage in a certain task, identifying that a user is intending to perform an online-platform service task, and determining one or more pay-per-ride insurance rates associated with the identified vehicle for user purchase.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
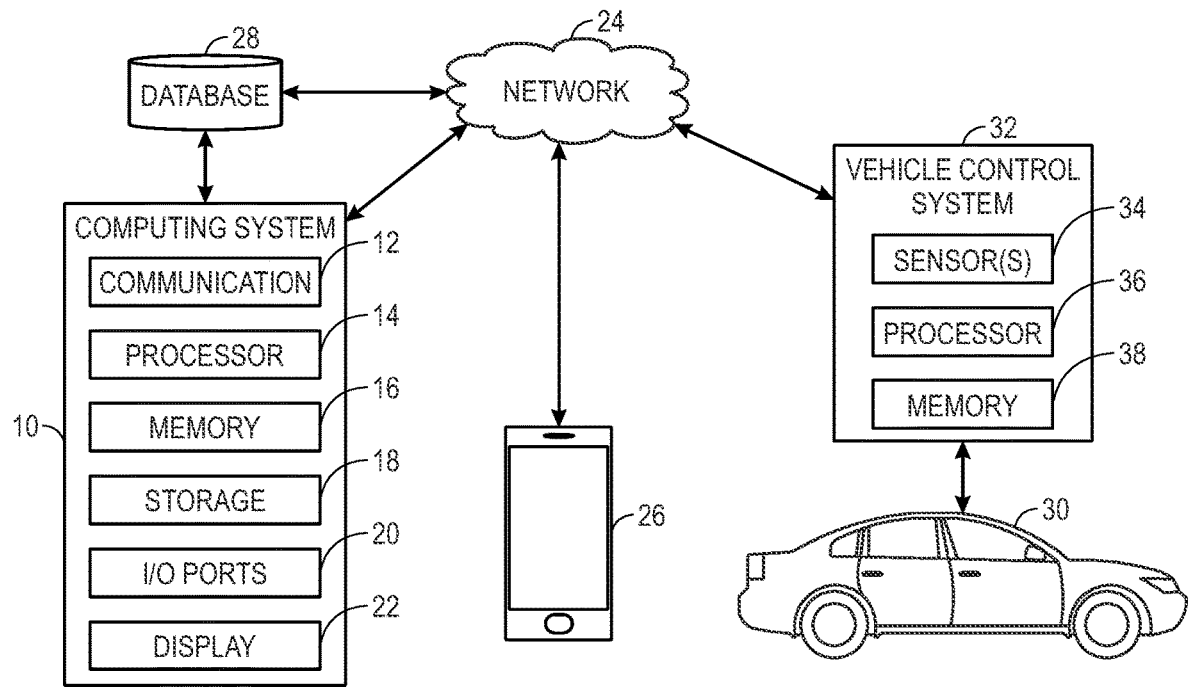
FIG. 1 illustrates a block diagram of a computing system communicatively coupled to a number of data sources, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

The increased prevalence of the gig economy that provides on-demand products and services via various online-platforms has altered the risk profiles for individuals participating in this market. For instance, online-platform service workers—such as those working in ride sharing or food delivery services—inherently have more insurance risk than a typical commuter due to the increase frequency of driving, the unfamiliarity of the drivers to their respective destinations, and the like. For example, such a worker may travel frequently in areas that are traffic conditions that exceed some threshold (e.g., greater than 5 minute delays), remain idle in a vehicle for periods of time, drive longer distances than other commuters, and face other additional risks that are not traditionally applicable to other commuters.

As such, it is presently recognized that many insurance customers that are online-platform service workers may desire that their insurance plans cover the unique risks that are associated with working in the respective gig economy. Additionally, insurance providers may wish to provide proper insurance coverage with properly reflected insurance premium prices to their customers.

With this in mind, systems and methods described below may be used to automatically identify one of a user's vehicles to use for a certain task and provide a custom insurance premium rate for a task that the user intends to complete within the gig economy. For instance, a computing system, in accordance with present embodiments, may evaluate the vehicles that are available for use by a user and determine which of the vehicles may be better suited to perform a certain task such as an online-platform service task. In addition, the computing system may provide insurance rates for performing the task using the identified vehicle. By way of example, the computing system may recommend that the user use a sport-utility vehicle (SUV), as opposed to a truck, to perform food delivery tasks to keep food warmer. In another example, the computing system may recommend that the user use a particular vehicle to perform a task that may involve the vehicle having a certain amount of idle time. In this case, an electric vehicle may be recommended to the user to reduce the wear on an engine of a gas-power vehicle if an electric vehicle is available for user by the use. In addition, the use of the electric vehicle may be associated with a reduced insurance risk and insurance premium in light of the electric vehicle's ability to reduce wear on its engine while remaining idle as compared to gas-powered vehicles.

With the foregoing in mind, providing dynamically adjustable insurance that covers a variety of risk scenarios pertaining to online-platform service workers may thus provide both the workers and insurance companies improved insurance coverage while minimizing costs. Indeed, the systems and methods described herein may enable users to secure pay-per-ride insurance based on the vehicle used to perform a task, the user's driving record, an expected route by the user, and the like. Additional details regarding systems and techniques for dynamically adjusting pay-per-ride insurance rates will be discussed below with reference to FIGS. 1-5.

To identify vehicles to use for certain tasks and dynamically adjust pay-per-ride insurance rates, present embodiments described herein may utilize a computing system to determine if a user is intending to perform a task. That is, in some embodiments the computing system may interact with various sensors and devices via a network to identify or determine a pay-per-ride insurance rate for a user based on a task that the user is intending to perform. In other embodiments, the computing system may interact with various sensors devices via a network to identify or determine a vehicle for the user based on a task the user is intending to perform.

By way of introduction, FIG. 1 illustrates a block diagram of a computing system 10 communicatively coupled to a variety of data sources that may provide data to the computing system 10 for dynamically adjusting pay-per-ride insurance rates for vehicle insurance policies. Devices such as a user device 26 or a vehicle control system 32 may provide the data to the computing system 10 via a network 26. This data may describe activities pertaining to a user's activities in relation to one or more vehicles 30 (e.g., location, speed, direction, idling, etc.). Additionally, a database 28 may provide user information to the computing system 10. The user information may detail a user's insurance information, properties of one or more user vehicles 30, and the like. After receiving the data, the computing system 10 may synthesize the data collected from the user device 26, the vehicle control system 32, the database 28, or any other suitable device to determine if the user is intending to perform or is performing an online-service task. The computing system 10 may use, in addition to other factors from the data, details about the online-service task (e.g., a type of task) to determine or adjust pay-per-ride insurance rates. In some embodiments, the computing system 10 may identify a user vehicle 30 is better suited to perform the identified online-service task.

The computing system 10 may include any suitable computer device, such as a general-purpose personal computer, a laptop computer, a tablet computer, a mobile computer, and the like. The computing system 10 may include various types of computer tasks and operations. For example, the computing system 10 may include a communication component 12, a processor 14, a memory 16, a storage 18, input/output (I/O) ports 20, a display 22, and the like. The communication component 12 may be a wireless or wired communication component that may facilitate communication between the computing system 10 and various other computing systems via a network, the Internet, or the like.

The processor 14 may be any type of computer processor or microprocessor capable of executing computer-executable code. The processor 14 may also include multiple processors that may perform the operations described below. The memory 16 and the storage 18 may be any suitable articles of manufacture that can serve as media to store processor-executable code, data, or the like. These articles of manufacture may represent computer-readable media (e.g., any suitable form of memory or storage) that may store the processor-executable code used by the processor 14 to perform the presently disclosed techniques. The memory 16 and the storage 18 may store data, various other software applications for analyzing the data, and the like. The memory 16 and the storage 18 may represent non-transitory computer-readable media (e.g., any suitable form of memory or storage) that may store the processor-executable code used by the processor 14 to perform various techniques described herein. It should be noted that non-transitory merely indicates that the media is tangible and not a signal.

The memory 16 and the storage 18 may be any suitable articles of manufacture that can serve as media to store processor-executable code, data, or the like. These articles of manufacture may represent computer-readable media (e.g., any suitable form of memory or storage) that may store the processor-executable code used by the processor 14 to perform the presently disclosed techniques. As used herein, applications may include any suitable computer software or program that may be installed onto the computing system 10 and executed by the processor 14. The memory 16 and the storage 18 may represent non-transitory computer-readable media (e.g., any suitable form of memory or storage) that may store the processor-executable code used by the processor 14 to perform various techniques described herein. It should be noted that non-transitory merely indicates that the media is tangible and not a signal.

The I/O ports 20 may be interfaces that may couple to other peripheral components such as input devices (e.g., keyboard, mouse), sensors, input/output (I/O) modules, and the like. The display 22 may operate as a human machine interface (HMI) to depict visualizations associated with software or executable code being processed by the processor 14. In one embodiment, the display 22 may be a touch display capable of receiving inputs from a user of the computing system 10. The display 22 may be any suitable type of display, such as a liquid crystal display (LCD), plasma display, or an organic light emitting diode (OLED) display, for example. Additionally, in one embodiment, the display 22 may be provided in conjunction with a touch-sensitive mechanism (e.g., a touch screen) that may function as part of a control interface for the computing system 10.

It should be noted that the components described above with regard to the computing system 10 are examples and the computing system 10 may include additional or fewer components relative to the illustrated embodiment. Additionally, the components listed as being part of the computing system 10 may also be components that are part of other computing devices described below.

In certain embodiments, the computing system 10 may be communicatively coupled to a network 24, which may include collections of computing systems, the Internet, an Intranet system, or the like. The network 24 may facilitate communication between the computing system 10 and various other data sources. For instance, the network 24 may be communicatively coupled to a user device 26. In some embodiments, the network 24 may also be communicatively coupled to one or more databases 28, which may store data regarding individuals such as driving records, credit information, banking information, insurance data, vehicle ownership data, and other information that may be publicly available regarding the individuals and relevant for obtaining vehicle insurance. In addition, the database 28 may include an exposed application programming interface (API) that provides data services regarding the individual's vehicle 30 use. Although the user device 26 and the database 28 are described as being communicatively coupled to the computing system 10 via the network 24, it should be noted that, in other embodiments, the user device 26 and the database 28 may be communicatively coupled directly to the computing system 10.

Referring back to the user device 26 (which may be integrated with or include a vehicle 30), the user device 26 may be a computing system such as a smartphone, a mobile tablet, a laptop computer, a wearable computer, an implanted computer, an automotive computer, and the like. In certain embodiments, the user device 26 may monitor the operation of a vehicle 30. The user device 26 may interact with a vehicle control system 32 of the vehicle 30 to gather information pertaining to the usage of the vehicle 30. For example, the user device 26 may monitor the location of the vehicle 30, frequency of use of a vehicle 30, times at which a vehicle 30 is in use, a mileage of the vehicle 30, and the like. To track this information, the user device 26 may include similar components as the computing system 10 described above. Moreover, the user device 26 may be communicatively coupled to various sensors or devices within the vehicle 30 to acquire data regarding the operation of the vehicle 30. By way of example, the user device 26 may be communicatively coupled to a global positioning system (GPS) of the vehicle 30, an odometer of the vehicle 30, an accelerometer, and other sensors that may provide information regarding the operation or location of the vehicle 30. Additionally, the user device 26 may be communicatively coupled to these various sensors or devices via interaction with the vehicle control system 32.

In addition to the sensor(s) of the user device 26, implementations described herein may include one or more sensors 32 that are associated with the vehicle control system 32 of the user's vehicle 30. The sensors 32 may measure and monitor vehicle data generated by the user's vehicle 30. The vehicle data may include data such as location data from one or more vehicle sensors 32, which may include one or more onboard cameras, location sensors, or a location module. The vehicle data may also include data from vehicle processor(s) 34, which may be in communication with the sensors 32. Vehicle operation data may be collected by processor(s) 34 and stored in a memory 36. In some implementations, the memory 36 may include one or more computer-readable media. The memory 36 may include any number of volatile memory units, any number of non-volatile memory units, or both volatile and non-volatile memory units. The memory 36 may include read-only memory, random access memory, or both. In some examples, the memory 36 may be employed as active or physical memory by one or more executing software modules.

In some embodiments, one or more vehicle sensors 32 may be onboard an external surface or structure of the vehicle 30. The sensors 32 may capture data that is used in present techniques. Such data may include visual data, gyroscopic or directional data, vehicle movement data, and other types of data. The sensors 32 may also capture data to monitor the vehicle's movement. For example, the sensors 32 may include one or more vehicle operation sensors (e.g., a motion sensor, an accelerometer, a gyroscope, and a wheel sensor). The movement data may include a speed of the vehicle 30 and a direction the vehicle 30 is traveling. The movement data may be described in any suitable unit of measurement (e.g., miles per hour, kilometers per hour, etc.) and in any suitable direction (e.g., north, south, east, west, etc.).

Visual data may include imagery captured by sensors 32 such as one or more cameras (e.g., a dash camera, a backup camera, a front camera, a side camera, or any other camera) within or mounted to the user's vehicle 30 or a camera of the user device 26. In some embodiments, certain cameras may be activated via a motion sensor. It may be appreciated that certain changes to the imagery captured by the cameras may indicate that the user will drive their vehicle 30.

Additionally, the user device 26 or the vehicle control system 32 may execute one or more location modules that determine a location of the vehicle 30. The location of the vehicle 30 may be determined using any suitable technique(s) to any appropriate degree of specificity. For example, the vehicle control system 32 may be communicatively coupled to location sensor(s), transceiver(s), or other software or hardware component(s) that are configured to determine the location using one or more of the following: an inertial navigation system, a dead-reckoning navigation system, a network positioning system, a radio position finding system, a satellite-based navigation system, an accelerometer system, a gyroscope system, and so forth. The satellite-based navigation system may include one or more of a Global Positioning System (GPS) receiver, a Global Navigation Satellite System (GLONASS) receiver, a Galileo receiver, an Indian Regional Navigational Satellite (IRNS) System receiver, and so forth. The location may also be determined through geolocation based on an internet protocol (IP) address of the user device 26 or the vehicle control system 32. In some cases, the location of the user device 26 or the vehicle 30 may be determined based on previously collected information describing the user device 26, such as a previously specified address of the user's home, workplace, social network posts, or other information indicating the user's presence at a location such as a restaurant, store, or other location.

Figure 2:
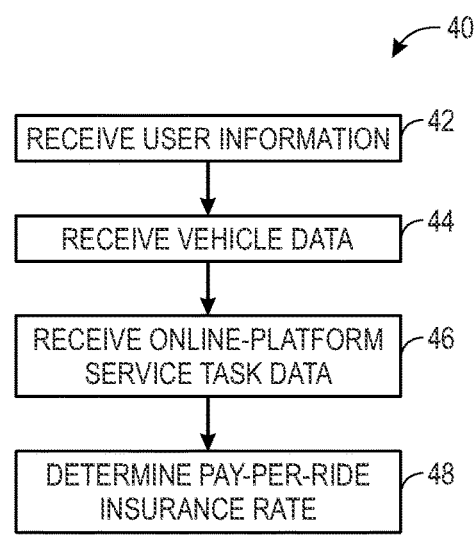
FIG. 2 illustrates a flow chart of a method for determining a pay-per-ride insurance rate for a personal variable policy premium based on the data acquired from the data sources of FIG. 1, in accordance with embodiments described herein.

The computing system 10 may receive information from the user via inputs provided through the I/O ports 20, the user device 26 via the network 24, the database 28, or any other sources. The computing system 10 may utilize the received information to dynamically determine a pay-per-ride insurance rate for the user based on a task that the user is intending to perform. With the foregoing in mind, FIG. 2 illustrates a flow chart of a method 40 for dynamically determining a pay-per-ride premium insurance rate for the user based on data acquired from the user device 26, the database 28, and the like. Although the method 40 is described in a particular order, it should be noted that the method 40 may be performed in any suitable order and is not limited to the order presented herein. It should also be noted that although each block is described below in the method 40 as being performed by the computing system 10, other suitable computing systems may perform the methods described herein.

Referring now to FIG. 2, at block 42, the computing system 10 may receive user information regarding a user seeking insurance. User information may be received from sources such as the database 28, directly via inputs provided by the user, or any publicly available sources that may provide information about the user. The user information may include any information relevant to an insurance provider for providing vehicle insurance. For example, the user information may include lifestyle information or information concerning transportation habits, such as the user's occupation and expected vehicle usage (e.g., performing online-platform service tasks, commuting to work, etc.). The user information may also include information related to the vehicle(s) 30 owned or leased by the user for which the user seeks coverage. For instance, the user information may include information such as the number of vehicles 30 owned by the user, a type of the vehicle(s) 30, a make of the vehicle(s) 30, a model of the vehicle(s) 30, a condition of the vehicle(s) 30, and the like. Such user information may enable the computing system 10 to determine a risk level associated with the user based on the user's vehicle(s) 30, the user's general frequency of usage of said vehicle(s) 30, and other factors. The determined risk level may be used by the computing system 10 in determining the user's pay-per-ride insurance.

In some embodiments, the user's information may contain driving record data associated with the user. The driving record data may be received from sources such as the database 28, directly via inputs provided from the user, or any publicly available sources that may provide information about the user. The driving record data may include information such as previous accidents the user was involved in, previous citations received for vehicle operation, and the like. In certain embodiments, the driving record data may be received via the database 28. Likewise, in other embodiments, the user may provide this information to the computing system 10 via a web-based application, a device coupled to the I/O ports 20, or the like. The computing system 10 may use the driving record data to determine the risk level associated with the user.

After receiving the data discussed above, the computing system 10 may receive vehicle data at block 44. The computing system 10 may receive the vehicle data from the user device 26, vehicle control system 32, or any other suitable monitoring system. The vehicle data may contain properties of the user's one or more vehicles 30 such as, but not limited to, the vehicle's 30 type, make, model, mileage, condition, and frequency of travel. The vehicle data may also include information pertaining to the user's operation of the vehicle 30, such as a location, a speed, a direction, and the like of a user's vehicle 30. Additionally, the computing system 10 may receive visual imagery captured from one or more sensors (e.g., cameras) within or mounted to the user's vehicle or a camera of the user device 26.

In tandem with receiving the vehicle data, the computing system 10 may receive data pertaining to the online-platform service task that the user intends to perform at block 46. The computing system 10 may receive online-platform service task data from the user device 26 or any other suitable device. The online service task data may include a type of online-platform service task the user intends to perform (e.g., ride sharing, food delivery, etc.), a user's rating associated with the online service task, specificities of the user's intended task (e.g., the user's intended route), and the like. In some embodiments, the specificities of the user's intended task may include further details pertaining to the user's intended route. For example, such specificities may include a calculated distance of the route, a calculated duration of time to complete the route, and so forth.

After receiving data from blocks 44 and 46, the computing system 10 may determine a pay-per-ride vehicle insurance rate for the user at block 48. The computing system 10 may use the acquired data to assess a risk value to insure the user, which may be used to calculate the pay-per-ride insurance rate. The pay-per-ride insurance rate may refer to a rate that is determined or identified based on various factors procured from the vehicle data and the online service task data. In one example, the type of task that the user intends to perform—along with the task's associated specificities—may weigh heavily for the computing system's 10 determination of the pay-per-ride insurance rate. That is, the pay-per-ride insurance rate may reflect the risk of the user performing the online service task. Continuing, the pay-per-ride insurance rate may be further associated with a base rate. The base rate may be a minimum amount of coverage under the personal variable premium rate and may be based on the risk value associated with the user, considering lifestyle and general usage received from the user and monitored by the computing system 10 for the defined period of time. Additionally, the pay-per-ride insurance rate may be associated with a vehicle rate. The vehicle rate may include both a vehicle base rate and a vehicle per mile rate, each based on the risk value associated with the user's vehicle 30. By determining the base rate and vehicle rate based on the user's vehicle 30 and usage of the vehicle 30 in their lifestyle, the pay-per-ride premium rate provided herein may enable transparency to the user and enable the user increased flexibility in controlling their premium cost and monthly bill.

Keeping the foregoing in mind, the computing system 10 may monitor user activities relating to the user's performance of an online-platform service task. Such user activities may be related to the user's vehicular activity and the user's computational usage of online-platform service applications. The computing system 10 may use data pertaining to the user's activities to determine if the user is performing an online-platform service task. In this way, the computing system 10 may use this determination to adjust the user's pay-per-ride insurance rate. That is, the computing system 10 may holistically evaluate the task that the user is performing to adjust the user's pay-per-ride insurance rate in a manner that adequately covers the user's risk.

Figure 3:
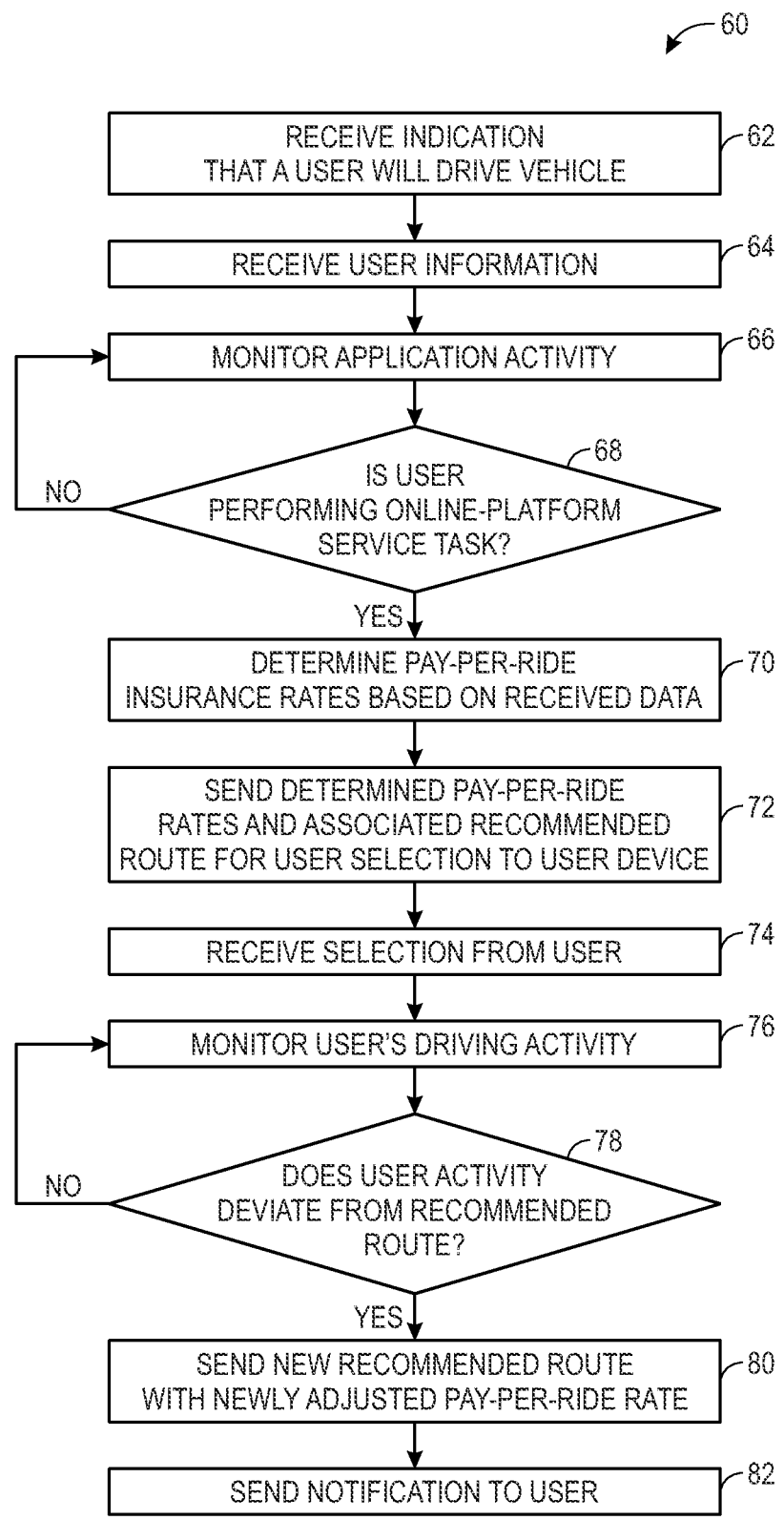
FIG. 3 illustrates a flow chart of a method for adjusting pay-per-ride insurance rates as determined according to the method of FIG. 2, in accordance with embodiments described herein.

FIG. 3 illustrates a flow chart of a method 60 for determining if a user is performing an online-platform service task and providing adjusted pay-per-ride insurance rates to the user based on received data. Although the method described in FIG. 3 is described in a particular order and as being performed by the computing system 10, it should be understood that the method may be performed in any suitable order and by any suitable computing device or application.

At block 62, the computing system 10 may receive an indication that a user is expected to drive a vehicle 30. In some embodiments, the indication may be provided by various sensors and devices communicatively coupled to the user device 26. Such sensors may include GPS, motion sensors, proximity sensors, a camera, and the like that may indicate that the user is proximate to their vehicle 30. For example, the computing system 10 may determine that the user is expected to drive their vehicle 30 when a proximity sensor detects that the user is within a certain distance of the vehicle 30. In other embodiments, the indication may be obtained from applications and other software associated with the user device 26. For instance, the user device 26 may contain applications that automatically communicatively couple to the user's vehicle 30 when the user enters the vehicle 30, such as via a Bluetooth® connection. In some embodiments, the user device 26 may be used to initialize, start, or operate the vehicle 30. Detection of such an automatic connection may indicate to the computing system 10 that the user is expected to drive their vehicle 30. In some embodiments, the computing system 10 may utilize several factors to determine that the user will drive their vehicle 30. For instance, the user may perform a navigation request on the user device 26 (e.g., requesting a route on a map application). The computing system 10 may detect this request and may then determine that the user is expected to drive their vehicle 30 if the user is within a certain distance of the vehicle 30 at the time that the navigation request was performed.

After receiving the indication that the user is expected drive a vehicle 30, the computing system 10 may receive user information at block 64. As described in FIG. 2, the user information may be received from sources such as the database 28, directly from the user, or any publicly available sources that may provide information about the user. The user information may enable the computing system 10 to determine a risk level associated with the user based on the user's vehicle 30, the user's general frequency of usage, and other similar factors. The risk level may be used by the computing system 10 in determining the user's pay-per-ride insurance.

At block 66, the computing system 10 may monitor for application activity that is indicative of the user performing a task that may be part of a gig economy. For example, the computing system 10 may determine a duration or frequency of use of a driver mode of ride-sharing applications on the user device 26. That is, the computing system 10 may detect that the user device 26 is accessing ride-sharing apps such as Uber™, Lyft™, Hitch™, and the like. Similarly, the computer system 10 may determine the duration or frequency of use of a driver mode of food delivery applications on the user device 26, such as Uber Eats™, Favor™, GrubHub™, and other similar applications. Moreover, the computing system 10 may determine the user's frequency and time of usage of map applications. Additionally, the computing system 10 may monitor the use of map applications used to gather location data and map routes for destinations that the user plans to visit.

Based on the application activity, the computing system 10 may determine whether the user is performing an online-platform service task at block 68. In some embodiments, the computing system 10 may use the data received from the user device 26 to identify patterns that indicate the likelihood of the user performing an online-platform service task. For instance, the computing system 10 may utilize several factors such as location data, the time of day, the date, the user's driving habits, the user's activity with online-based platform applications, and the like to determine if the user's activity fits a pattern consistent with performing online-platform service tasks. For example, such a pattern may include one or more of the following factors concerning the user's activity: driving through highly populated areas, using the driver mode of an online-based platform application, idling for a certain amount of time near restaurants, hotels, bars, and the like, performing any of the preceding tasks at a time of day and a date that is associated with a high level of activity for online-based tasks, and so forth.

Additionally, in accordance with the above-described embodiments the computing system 10 may utilize previously set thresholds to determine if the user is performing an online-platform service task. Such thresholds may include the amount of distance the user travels during a single trip, the duration of time the user idles near highly-populated areas, the amount of time that the user spends on a driver mode of an online-platform service work application, and the like. Such thresholds may aid the computing system 10 to determine if the user's activity is likely corresponding to a pattern of performing online-platform service tasks. These thresholds may be dynamically adjusted by the computing system 10 based on changing driving habits and activities by the user.

The computing system 10 may determine that the user is not performing an online-platform service task. In this case, the computing system 10 may continue to monitor for application activity as described in block 66. The computing system 10 may monitor continuously for a certain period of time. Moreover, the computing system 10 may use vehicle data to regulate the monitoring of application activity. For example, the computing system 10 may cease monitoring if the computing system 10 detects that the vehicle 30 has had a speed of zero for a certain amount of time.

If the computing system 10 determines that the user is performing an online-platform service task, the computing system 10 may proceed to block 70 and determine a pay-per-ride insurance rate for the user and the expected trip. In order to determine the pay-per-ride insurance rate, the computing system 10 may first retrieve data related to the task that the user is intending to perform. Such data may include the task's type, the user's intended destination, traffic patterns on the user's intended route, a day of time, the user's rating, and the like. The computing system 10 may retrieve the data from the user device 26. That is, the data may be retrieved from applications or software on the user device 26 such as an online-platform service work application, a maps application, and the like.

In addition to the details related to the particular trip that the user intends to take, the computing system 10 may also determine relevant risk factors associated with the user's previous activity. For example, the computing system 10 may integrate the following factors to determine a user's risk factor: the user's present driving habits (e.g., the user's propensity for speeding or breaking any other traffic laws), the location history of where the user is located (e.g., if the location in which the user is driving is an area associated with a relatively higher percentage of traffic or accident rates), and other factors.

After the computing system 10 has determined the risk factors of the user, the computing system 10 may determine one or more map routes that the user may use to perform the tasks. The computing system 10 may then determine one or more pay-per-ride insurance rates associated with the determined map routes. The rates may thus be different to reflect the associated risk associated with each of the map routes. For example, one pay-per-drive rate may reflect a higher rate for a map route with more risk—such as one that has the user go through more highly trafficked areas in contrast to another map route which goes through a route with less risk (i.e., less trafficked areas).

After determining the pay-per-ride insurance rates for different map routes that the user may use to perform the particular task, the computing system 10 may send the determined rates and the associated recommended routes to the user device 26 via the network 24 at block 72. In some embodiments, the computing system 10 may send a push notification to the user device 26 to notify the user that pay-per-ride insurance rates are available for purchase. In certain embodiments, the determined rates and associated recommended routes may be displayed by the user device 26 via an application that overlays the determined routes onto a virtual map of the user's area. Each route may be displayed alongside its associated rate and other relevant information, such as the duration of time it will take the user to complete the route. In some embodiments, the pay-per-ride insurance rates may be presented via a map application or an application that guides the user while performing the online-platform service task.

At block 74, the computing system 10 may receive a selection of one of the map routes, one of the pay-per-ride insurance rates, or both from the user. In some embodiments, the computing system 10 may receive the selection via inputs provided on the user device 26 and routed to the computing system 10 via the network 28.

After receiving the selection of a pay-per-ride rate and associated route from the user, the computing system 10 may, at block 76, monitor the user's driving activity. That is, the computing system 10 may monitor the user vehicle's 30 speed, direction, location, and the like. The monitored data may aid in determining if the user is traveling on the recommended route and if the user is driving in a manner compliant with their selected pay-per-ride insurance (e.g., following traffic laws). In some embodiments, the computing system 10 may, as described above, receive location data from various sensors communicatively coupled to the user device 26 or vehicle control system 32.

At block 78, the computing system 10 may determine if the user's driving activity deviates from the recommended route or expected behavior of the user. Based on the data gathered at block 76, the computing system 10 may detect that the user has deviated from the recommended route, is behaving in an unexpected manner (e.g., using different devices while driving, speeding), or is performing any action that is not in compliance with the selected pay-per-ride insurance. If the user does not deviate from the recommended route, the computing system 10 may continuously monitor the user's driving activity until a certain condition is met. For instance, as long as the user does not deviate from the recommended route, the computing system 10 may continue to actively monitor the user's driving activity until the user reaches their destination.

At block 80, if the computing system 10 detects that the user is driving in an unexpected manner, the computing system 10 may adjust the pay-per-ride insurance rate and determine a new route to recommend to the user with the adjusted pay-per-ride insurance rate. The new route may be determined by the computing system 10 and then transmitted to the user device 26 via the network 24. Moreover, the computing system 10 may send a notification to the user that they have deviated from the recommended route and that new routes are available for selection. In some embodiments, the computing system 10 may dynamically update the recommended route based on the user's location. After each update, the computing system 10 may send a notification to the user device 26 to signal to the user that the recommended route has been updated. Additionally, in some embodiments the user may only have a set amount of time to begin following the new recommended route. In this scenario, after this certain time has expired the computing system 10 may again adjust the pay-per-ride insurance rate based on any changes that may occur to the rate (e.g., due to change in traffic).

As discussed above, the computing system 10 may collect data regarding a user that may be performing an online-platform service task via the network 24 in accordance with the method 80 described above. Using the collected data, the computing system 10 may determine pay-per-ride insurance rates alongside an associated route for the user to perform an online-platform service task under full insurance coverage. The computing system 10 may then monitor user activity data from user device 26 with respect to whether the user's activity does not deviate from the recommended route.

Figure 4:
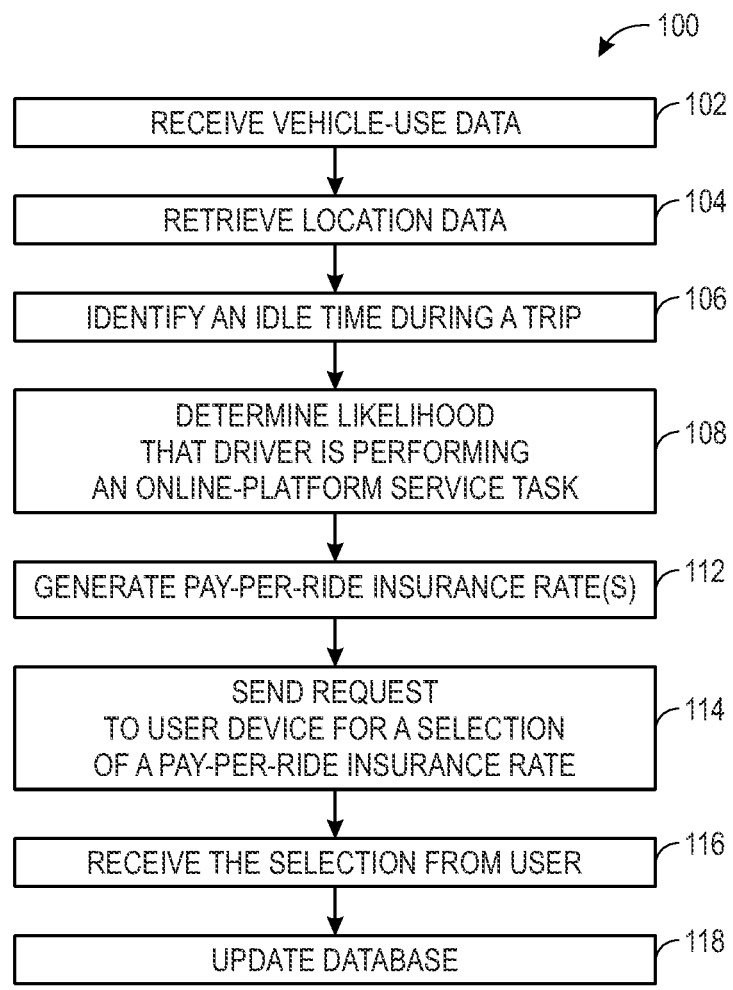
FIG. 4 illustrates a flow chart of a method for determining if a user qualifies for pay-per-ride insurance rates based on data acquired from the data sources of FIG. 1, in accordance with embodiments described herein.

With this in mind, FIG. 4 illustrates a method 100 that the computing system 10 or other suitable computing device may implement to determine that the user is performing an online-platform service task as to generate one or more pay-per-ride insurance rates. Although the method 100 is described as being performed by the computing system 10, it should be noted that any suitable computing system may perform the method 100. Moreover, although the method 100 is described in a particular order, it should be noted that the method 100 may be performed in any suitable order.

Referring now to FIG. 4, at block 102 the computing system 10 may receive vehicle-use data. The vehicle-use data may be captured via sensors communicatively coupled to the user device 26, vehicle control system 32, or any other suitable device. Such sensors may include accelerometers, odometers, GPS, motion sensors, proximity sensors, gyroscopes, biometric sensors, a camera, and the like. The vehicle-use data may detail a speed of a user's vehicle 30, a location of a user's vehicle 30, a direction of a user's vehicle 30, and so forth. Moreover, the vehicle-use data may include visual imagery of the exterior and interior of the user's vehicle 30. The computing system 10 may use the visual imagery to determine if there are one or more passengers in the user's vehicle 30.

Likewise, the computing system 10 may receive location data of the user's vehicle 30 at block 104. The location data may be retrieved from the user device 26, vehicle control system 32, or any other suitable device. In addition to the location of the user's vehicle, the location data may provide further details such as what street the user's vehicle 30 is on, current traffic patterns on the street, historical traffic patterns of the user's location, and the like. In some embodiments, the location data may indicate if the user's vehicle 30 is located near areas associated with online-platform service work (i.e., highly populated areas) such as, but not limited to: airports, restaurants, hotels, bars, clubs, grocery stores, concert venues, and stadiums.

After receiving the vehicle-use data and the location data, the computing system 10 may analyze the vehicle-use data to determine if the user is idling their vehicle 30 at block 106. For instance, the computing system 10 may determine that an idle time has occurred when the user's vehicle 30 has had a relative velocity of zero miles per hour for a certain period of time. In another example, an idle time may be identified when the vehicle's 30 location has not changed for a certain amount of time. In each scenario, the computing system 10 may store each instance of an idle time in the storage 18, the database 28, or any other suitable storage device.

The computing system 10 may then determine a likelihood that the user is performing an online-platform service task at block 108. In some embodiments, the computing system 10 may determine this likelihood by analyzing one or more relationships between the location data and the vehicle-use data. For example, if the vehicle idle time corresponds to locations in which online-platform service tasks are expected to wait to pick up passengers for a ride, wait to receive food orders, or perform any other task that may involve waiting, the computing system may determine that the user is performing the online-platform task. In addition, if the computing system 10 detects that a maps or driving application is concurrently being executed with another application associated with performing an online-platform task, the computing system 10 may determine that the user is performing the online-platform task. The computing system 10 may also incorporate various factors in its analysis, such as the time of day, the date, the user's driving habits, the user's activity with online-based platform applications, and the like. These factors may be considered by the computing system 10 to better ascertain whether the user performing an online-platform service task based on patterns of activities performed by other users that perform online-platform service tasks. In some embodiments, the computing system 10 may use one or more factors to generate a certain confidence threshold score indicating a likelihood that the user is performing an online-based service task. That is, for example, the detected presence of a factor related to the expected behavior of the online-platform service worker may contribute to an increase in a raw confidence score in characterizing the user as performing an online-platform service task.

In some embodiments, the computing system 10 may determine if the user is intending to perform an online-platform task when a confidence score associated with the user's activity exceeds a certain threshold confidence score. In some embodiments, one factor alone may not provide the confidence threshold that indicates identifiable online-platform service activity. However, when multiple factors or single factors occurring in multiple instances are identified, the calculated confidence score may increase. By utilizing a certain threshold score limit, the computing system 10 may decrease the number of false positives in identifying online-platform service tasks. Thus, not only will the owner of the computing system 10 be able to provide more accurate rates to users, the users' experience with pay-per-ride insurance may be improved. Further, machine learning may be used to refine such analysis, where the training data for the machine learning may be prior observed driving activity. If the confidence score does not exceed the threshold, the computing system 10 may return to receiving vehicle use data (block 102).

After determining that the user is performing an online service task, the computing system 10 may generate one or more pay-per-ride insurance rates at block 110. The insurance rates may be adjusted based on factors retrieved from the data gathered, such as a type of task the user is performing, a user's intended destination, a user's online service task rating, a day of time, a date, and the like. In some embodiments, the computing system 10 may analyze one or more routes to the user's destination and generate corresponding insurance rates for each route. The computing system 10 may incorporate factors related to each route into its analysis, such as traffic patterns of the route, traffic laws on the route (e.g., speed limits), a distance of the route, an estimated time to complete the route, and the like. The computing system 10 may utilize this analysis to generate several insurance rates that cover the analyzed risk corresponding to each route. In this way, the user may have the freedom to choose a rate and associated route that best fits their needs. In one instance, the user may elect to choose a longer, slower route with a cheaper associated rate as opposed to a slower, faster route with a more expensive associated rate as to save money, and vice versa.

At block 112 the computing system 10 may send a request to the user device 26 for a selection of pay-per-ride insurance. In one embodiment, the processor(s) 14 may output a notice or alert via a notification system to the user device 26 indicating that pay-per-drive insurance is available for purchase. In other embodiments, the computing system 10 may send a push notification to the user device 26 to notify the user that pay-per-ride insurance rates are available for purchase. In another embodiment, the determined rates and associated recommended route may be displayed by the user device 26 via an application that overlays the determined routes onto a virtual map of the user's area. Each route may be displayed alongside its associated rate and other relevant information, such as a duration of time it will take the user to complete the route.

The computing system 10 may receive a selection of a pay-per-ride insurance rate from the user device 26 at block 114. In one embodiment, the selection may be transmitted from the user device 26 to the computing system 10 via the network 24. At block 116, the computing system 10 may update the database 28 or any other suitable storage device with the user's selected pay-per-ride insurance rate.

As discussed above, the computing system 10 may receive vehicle data from a user device 26 in accordance with the method 100 detailed above. The computing device 10 may collect location data and vehicle use data of the user's vehicle, and the computing device 10 may detect vehicle use to detect if the vehicle 30 is idling. The computing device 10 may then provide pay-per-ride insurance rates based on the retrieved data and the user's intended online platform service task.

Figure 5:
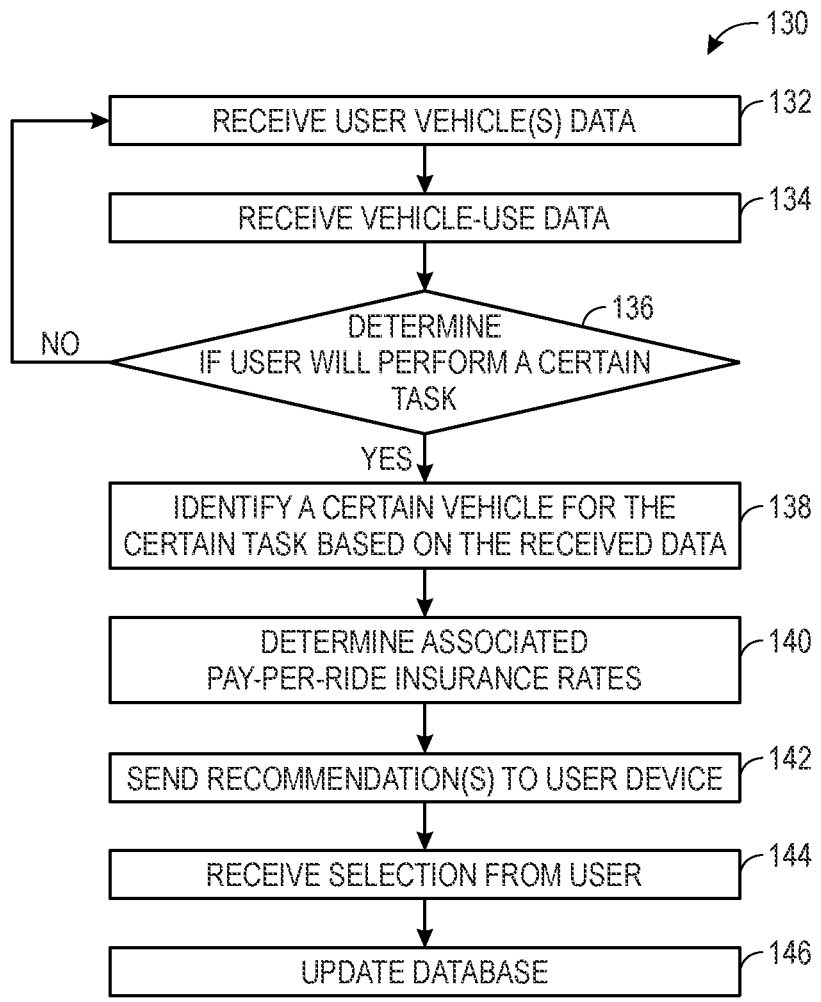
FIG. 5 illustrates a flow chart of a method for determining a certain vehicle for a certain task that the user may perform based on data acquired from the data sources of FIG. 1, in accordance with embodiments described herein.

With this in mind, FIG. 5 depicts a method 130 in which the computing system 10 or any other suitable computing device may implement a process to identify one of a user's vehicles 30 to use for a certain task and provide a custom insurance premium rate for a task that the user intends to complete within the gig economy. Although the method 130 is described as being performed by the computing system 10, it should be noted that any suitable computing system may perform the method 130. Moreover, although the method 130 is described in a particular order, it should be noted that the method 130 may be performed in any suitable order.

Referring now to FIG. 5, the computing system 10 may receive user vehicle data from the database 28 or any other storage device at block 132. The vehicle data may provide information pertaining to vehicles 30 associated with the user (e.g., vehicles 30 that the user owns or rents). For each user vehicle 30, the vehicle data may detail properties of the user's one or more vehicles 30 such as, but not limited to, the vehicle's 30 type, make, model, mileage, condition, and frequency of travel. Moreover, the vehicle data may indicate of fuel the vehicle 30 uses, such as gasoline, diesel, electricity, a hybrid of fuels, and the like.

The computing system 10 may retrieve vehicle-use data at block 136. The vehicle-use data may detail a user's driving history. For example, the vehicle-use data may contain information such as a time of day that the user usually drives, a destination(s) that a user typically visits, days in which the user performs a high level of vehicle activity (and vice versa), and the like. In some embodiments, the vehicle-use data may contain further non-vehicular information associated with the user's driving history. For instance, the vehicle use data may detail a history of the user's driving behavior in relation to historical, detected, or predicted weather patterns.

The computing system 10 may also determine if a user's vehicle 30 has remained idle for some period of time. The computing system 10 may define the user's vehicle 30 as idle if the vehicle-use data indicates that the position of the vehicle 30 has remained static or the vehicle's 30 speed has remained at zero for a certain period of time. Additionally, extended periods of idleness may be flagged by the computing system 10. For example, the computing system 10 may identify that the user's vehicle 30 has been idle for an X amount of days, weeks, months, etc.

At block 136, the computing system 10 may determine if the user is intending to perform an online-platform task. In some embodiments, an online-platform service task may be identified when the certain threshold confidence score associated with the user's activity exceeds a certain threshold confidence score. As detailed in the description of FIG. 4, the computing system 10 may use one or more factors to calculate the confidence score. If the confidence score does not exceed the threshold, the computing system 10 may return to receiving vehicle use data (block 132).

If the computing system 10 determines that the user will likely perform a certain task, the computing system 10 may identify one of a user's vehicles 30 to use for the task at block 138. That is, the computing system 10 may determine which of the user's vehicles 30 is better suited to perform the task based on characteristics of the vehicle 30, operational history of vehicle 30, the nature of the task, and the like. For example, the computing system 10 may conduct an analysis of the characteristics of the user vehicle(s) 30 utilizing one or more of factors of the user vehicle(s) 30 such as: miles-per-gallon (MPG), type (e.g., SUV, pickup truck, sedan, etc.), towing capacity, passenger capacity, engine type, engine size, engine power, four-wheel drive capabilities, and the like. Based on the type of task being performed by the user, the computing system 10 may identify one of the user's vehicles 30 that is better suited to perform a certain task. For one example, the user's vehicle 30 with a higher passenger capacity and a higher MPG may be identified as best suited for ride sharing services because the increased capacity may be used to facilitate additional passengers and the high MPG may allow the user to save gas costs. In another example, the computing system 10 may determine that the user should use a vehicle 30 that has been less active as compared to the user's other vehicles to perform certain tasks. In doing so, the effects of inactivity of the vehicle 30, such as structural issues (e.g., deformed tires due to remaining in the same position for prolonged periods), issues with engine fluids (e.g., fuel and lubricant breaking down), and the like, may be mitigated. In another example, the computing system 10 may decide not to suggest a vehicle 30 with a high level of inactivity for a certain task, as the user may be at more risk if the vehicle 30 is not well maintained. To identify the user vehicle 30 best suited for the task, the computing system 10 may utilize thresholds that relate to the duration of inactivity of the user vehicle 30. For example, the computing system may set a duration A and a duration B for the user's vehicle 30 level of inactivity, where B is a greater duration than A. In one instance, the computing system 10 may determine that the vehicle 30 should be used to perform a task if the vehicle's duration of inactivity is between A and B. Likewise, the computing system 10 may determine that the vehicle 30 should not be used to perform a task if the vehicle's duration is greater than B. The calculation of these thresholds may incorporate one or more factors as discussed above (e.g., characteristics of the vehicle 30, nature of the task, etc.). Lastly, a machine learning algorithm may be used to refine such analysis as described above, the training data for the machine learning algorithm may be gathered from one or more other users that are performing similar tasks using similar vehicles 30.

At block 140, the computing system 10 may determine a pay-per-ride insurance rate associated with the identified user vehicle(s) 30 and the associated certain task. In some embodiments, the computing system 10 may take into consideration several risk factors concerning the user and their vehicle 30. Such factors may be derived from the vehicle-use data, the vehicle data, the type of task, road conditions (e.g., local weather, traffic), a user's intended destination, a user's online service task rating, a day of time, a date, and the like. In some embodiments, the computing system 10 may analyze one or more routes to the user's destination and generate corresponding insurance rates for each route. The computing system 10 may incorporate factors related to each route into its analysis, such as traffic patterns of the route, traffic laws on the route (e.g., speed limits), a distance of the route, an estimated time to complete the route, and the like. The computing system 10 may utilize this analysis to generate several insurance rates that cover the analyzed risk corresponding to each route. That is, the insurance rates may increase when risk factors associated with a higher likelihood of sustaining vehicle damage increases. For example, insurance rates may increase when the weather is raining, when the route is determined to have higher than an expected amount of traffic, and the like.

After determining a certain vehicle 30 that is better suited to perform a certain task and an associated per-drive insurance rate, at block 142 the computing system 10 may send a recommendation to the user device 26 to use the determined vehicle 30 for the determined task. In one embodiment, the computing system 10 may output a notice or alert to the user device 26 via a notification system to alert parties, such as the user, to use a certain vehicle 30. In other embodiments, the computing system 10 may send a push notification to the user device 26 to notify the user that one or more pay-per-ride insurance rates associated with the recommended vehicle 30 are available for purchase.

At block 144, the computing system 10 may receive a selection of a vehicle 30 and associated pay-per-ride insurance rate from the user device 26. In one embodiment, the selection may be transmitted from the user device 26 to the computing system 10 via the network 24. At block 146, the computing system 10 may update the database 28 or any other suitable storage device with the user's selected pay-per-ride insurance rate (block 148).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:
receiving, via a processor, an indication that a vehicle is in use from a vehicle system associated with the vehicle after the processor communicatively couples to the vehicle system;
determining, via the processor, that a user of the vehicle is expected to perform an online-platform task based on one or more applications concurrently being executed by the processor and one or more patterns associated with performing the online-platform task by:
receiving location data from a sensor within the vehicle, wherein the location data is associated with one or more locations of the vehicle over time;
comparing the location data to a set of locations associated with performing the online-platform task, wherein the online-platform task comprises a food delivery task or a ride-share task; and
determining that the user is expected to perform the online-platform task based on the one or more locations matching the set of locations according to the one or more patterns;
determining, via the processor, one or more routes for the vehicle to travel to perform the online-platform task in response to determining that the user is expected to perform the online-platform task;
determining, via the processor, one or more insurance rates for the one or more routes based on a type of the online-platform task and the one or more routes, wherein the type of online-platform task comprises a ride-sharing task or a food delivery task; and
displaying, via the processor, a visualization indicative of the one or more insurance rates via an electronic display.

2. The method of claim 1, comprising:
receiving a selection of a first route of the one or more routes that corresponds to a first insurance rate of the one or more insurance rates;
detecting that the vehicle is deviating from the first route; and
adjusting the first insurance rate in response to detecting that the vehicle is deviating from the first route.

3. The method of claim 1, wherein the indication that the vehicle is in use corresponds to the processor communicatively coupling to a vehicle system.

4. The method of claim 1, wherein the indication that the vehicle is in use corresponds to receiving a navigation request to a destination.

5. The method of claim 1, comprising determining that the user of the vehicle is expected to perform an online-platform task based on the one or more applications and one or more additional patterns associated with performing the online-platform task, wherein the one or more additional patterns comprise using a driver mode of the one or more applications, idling for a period of time, or both.

6. The method of claim 1, wherein the visualization is presented as part of the one or more applications.

7. The method of claim 1, wherein the one or more insurance rates are determined based on one or more traffic patterns associated with each of the one or more routes, an estimated amount of time to complete each of the one or more routes, a distance associated with each of the one or more routes, or any combination thereof.

8. A non-transitory computer-readable medium comprising computer-executable instructions that, when executed, are configured to cause at least one processor to perform operations comprising:
receiving an indication that a vehicle is in use from a vehicle system associated with the vehicle after the at least one processor communicatively couples to the vehicle system;
determining that a user of the vehicle is expected to perform an online-platform task based on one or more applications concurrently being executed by the at least one processor and one or more patterns associated with performing the online-platform task by:
receiving location data from a sensor within the vehicle, wherein the location data is associated with one or more locations of the vehicle over time;
comparing the location data to a set of locations associated with performing the online-platform task, wherein the online-platform task comprises a food delivery task or a ride-share task; and
determining that the user is expected to perform the online-platform task based on the one or more locations matching the set of locations according to the one or more patterns;
determining one or more routes for the vehicle to travel to perform the online-platform task in response to determining that the user is expected to perform the online-platform task;
determining one or more insurance rates for the one or more routes based on a type of the online-platform task and the one or more routes, wherein the type of online-platform task comprises a ride-sharing task or a food delivery task; and
displaying a visualization indicative of the one or more insurance rates via an electronic display.

9. The non-transitory computer-readable medium of claim 8, wherein the computer-executable instructions that, when executed, are configured to cause at least one processor to perform the operations comprising sending a notification to a computing device, wherein the notification comprises a request to purchase insurance for a ride via the vehicle.

10. The non-transitory computer-readable medium of claim 8, wherein the visualization comprises a respective insurance rate of the one or more insurance rates adjacent to a respective route of the one or more routes.

11. The non-transitory computer-readable medium of claim 8, wherein the computer-executable instructions that, when executed, are configured to cause at least one processor to perform the operations comprising:

identifying an additional vehicle to perform the online-platform task based on a type of the online-platform task; and sending a notification to a computing device associated with the user, wherein the notification comprises a recommendation to use the additional vehicle to perform the online-platform task.

12. The non-transitory computer-readable medium of claim 8, wherein the computer-executable instructions that, when executed, are configured to cause at least one processor to perform the operations comprising:

receiving a selection of a first route of the one or more routes that corresponds to a first insurance rate of the one or more insurance rates;

detecting that the vehicle is deviating from the first route; and adjusting the first insurance rate in response to detecting that the vehicle is deviating from the first route.

13. The non-transitory computer-readable medium of claim 8, wherein the indication that the vehicle is in use corresponds to receiving a navigation request to a destination.

14. The non-transitory computer-readable medium of claim 8, wherein the computer-executable instructions that, when executed, are configured to cause at least one processor to perform the operations comprising determining that the user of the vehicle is expected to perform an online-platform task based on the one or more applications and one or more additional patterns associated with performing the online-platform task, wherein the one or more additional patterns comprise using a driver mode of the one or more applications, idling for a period of time, or both.

15. A system, comprising:
an electronic display; and
a computing system configured to:
determine that a user of a vehicle is expected to perform an online-platform task based on one or more applications concurrently being executed by the computing system and one or more patterns associated with performing the online-platform task by:
receiving location data from a sensor within the vehicle, wherein the location data is associated with one or more locations of the vehicle over time;
comparing the location data to a set of locations associated with performing the online-platform task, wherein the online-platform task comprises a food delivery task or a ride-share task; and
determining that the user is expected to perform the online-platform task based on the one or more locations matching the set of locations according to the one or more patterns;
determine one or more routes for the vehicle to travel to perform the online-platform task in response to determining that the user is expected to perform the online-platform task;
determine one or more insurance rates for the one or more routes based on a type of the online-platform task and the one or more routes, wherein the type of online-platform task comprises a ride-sharing task or a food delivery task; and
display a visualization indicative of the one or more insurance rates via an electronic display.

16. The system of claim 15, wherein the computing system is configured to:
receive a selection of a first route of the one or more routes that corresponds to a first insurance rate of the one or more insurance rates;
detect that the vehicle is deviating from the first route; and
adjust the first insurance rate in response to detecting that the vehicle is deviating from the first route.

17. The system of claim 15, wherein the computing system is configured to send a notification to a computing device, wherein the notification comprises a request to purchase insurance for a ride via the vehicle.

18. The system of claim 15, wherein the visualization comprises a respective insurance rate of the one or more insurance rates adjacent to a respective route of the one or more routes.

19. The system of claim 15, wherein the computing system is configured to:
identify an additional vehicle to perform the online-platform task based on a type of the online-platform task; and
send a notification to a computing device associated with the user, wherein the notification comprises a recommendation to use the additional vehicle to perform the online-platform task.

* * * * *